(12) United States Patent
Dickmander et al.

(10) Patent No.: US 6,577,111 B1
(45) Date of Patent: Jun. 10, 2003

(54) CONTROLLING MAGNETIZING CURRENT IN A TRANSFORMER BY COMPARING THE DIFFERENCE BETWEEN FIRST AND SECOND POSITIVE PEAK VALUES OF THE MAGNETIZING CURRENT WITH A THRESHOLD

(75) Inventors: David L. Dickmander, Cary, NC (US); Aaron M. Jungreis, Cary, NC (US); Jeffery Parker, Zebulon, NC (US)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 09/948,248

(22) Filed: Sep. 6, 2001

(51) Int. Cl.[7] .................................................. H01F 40/14
(52) U.S. Cl. ........................................ 323/356; 323/359
(58) Field of Search ................................ 323/356, 357, 323/358, 359

(56) References Cited

U.S. PATENT DOCUMENTS

| | | | | |
|---|---|---|---|---|
| 3,786,338 A | * | 1/1974 | Gilbert | |
| 4,150,424 A | * | 4/1979 | Nuechterlein | 363/97 |
| 4,255,704 A | | 3/1981 | Milkovic | 324/127 |
| 4,255,705 A | | 3/1981 | Milkovic | 324/127 |
| 4,278,940 A | * | 7/1981 | Milkovic | 323/357 |
| 4,439,822 A | * | 3/1984 | Cocconi | 363/56 |
| 4,477,867 A | * | 10/1984 | Pellegrino | 363/97 |
| 4,584,635 A | * | 4/1986 | MacInnis et al. | 363/56 |
| 5,245,520 A | | 9/1993 | Imbertson | 363/17 |
| 5,276,394 A | * | 1/1994 | Mayfield | 323/356 |
| 5,355,299 A | * | 10/1994 | Carpita | 363/95 |
| 5,742,494 A | | 4/1998 | Brakus et al. | 363/41 |
| 6,175,166 B1 | | 1/2001 | Bapat | 307/64 |

* cited by examiner

Primary Examiner—Jeffrey Sterrett
(74) Attorney, Agent, or Firm—Woodcock Washburn LLP (57) ABSTRACT

Differential measurement of a transformer magnetizing current and a delta-modulation technique is used to provide compensation for dc saturation of the transformer core, with faster response times, low losses, and with immunity to dc drift in the measuring electronics. During the half-cycle in which the output voltage transitions from its positive maximum to its negative maximum, the positive peak value of the magnetizing current is determined, and during the half-cycle in which the output voltage transitions from its negative maximum to its positive maximum, the negative peak value of the magnetizing current is determined. The positive peak magnetizing current value is compared to the similar value from the previous cycle, and the onset of core saturation in the positive direction is then determined. The negative peak magnetizing current value is compared to the similar value from the previous cycle, and the onset of core saturation in the negative direction is then determined. Based on the results of the core saturation determinations, a control action is determined in accordance with a truth table.

20 Claims, 9 Drawing Sheets

CONTROLLING MAGNETIZING CURRENT IN A TRANSFORMER BY COMPARING THE DIFFERENCE BETWEEN FIRST AND SECOND POSITIVE PEAK VALUES OF THE MAGNETIZING CURRENT WITH A THRESHOLD

FIELD OF THE INVENTION

The present invention relates in general to transformers and, more particularly, to the control of magnetizing current in inverter-fed transformers.

BACKGROUND OF THE INVENTION

Switch-mode converters employing pulse width modulation (PWM) are widely used for dc-dc and dc-ac applications. This type of converter can be used in a dc-ac inverter configuration to produce a power-frequency sinusoidal voltage that is applied to an output transformer. Because the inverter may produce an unwanted small direct voltage across the transformer in addition to the power-frequency sinusoid, dc saturation of the transformer core may occur. A technique that might be considered to compensate for this effect is direct measurement of the inverter output voltage with a proportional-integral (PI) controller used to remove the dc component. This technique can remove the dc component of voltage over time, but can leave the transformer with a surplus or deficit of volt-seconds, resulting in persistent dc current. For this reason, prevention of dc saturation is conventionally accomplished by measurement of the transformer primary current, from which the dc component is extracted by analog and/or digital filtering techniques. Measurement of the transformer primary current is conventionally accomplished by insertion of a low-ohmic sense resistor in series with the transformer primary, or by routing the transformer primary through a dc measurement transducer, which may be a Hall effect or other device.

The conventional techniques have several drawbacks. A first drawback is the excessive rating requirement for the current measuring device in that the device must be rated for the full primary current. Another drawback is the slow response times that are the result of filtering time delays. In other words, analog filtering to extract the dc component from a power frequency component (e.g., 60 Hz) must necessarily employ large time constants. Digital (rolling average) filtering can improve this, provided that arrangements are made to ensure that the filtering algorithm is phase-locked to the power-frequency output voltage. Yet another drawback is the sensitivity to dc drift in the measuring electronics. Any technique that attempts to measure the dc component of the transformer primary current introduces the difficulty of distinguishing between real dc current and dc drift in the electronics due to temperature and/or other effects. For this reason, the conventional techniques may use a sense resistor in series with the transformer primary. Use of a sense resistor eliminates the dc drift that is a characteristic of Hall effect devices, but the sense resistor introduces additional losses into the circuit. For high-current applications, the losses introduced by the sense resistor can become prohibitive. Furthermore, this technique does not eliminate other sources of dc drift in the analog electronics used to amplify the current signal.

Thus, there is a need to control the magnetizing current and compensate for dc saturation of the transformer core with faster response time, low losses, and with immunity to dc drift in the measuring electronics.

SUMMARY OF THE INVENTION

The present invention is directed to the use of differential measurement of the transformer magnetizing current and a delta-modulation technique to provide compensation for dc saturation of the transformer core, with faster response times, low losses, and with immunity to dc drift in the measuring electronics.

According to embodiments of the invention, systems and methods of controlling a magnetizing current in a transformer having an output voltage and a peak primary voltage are provided, and comprise determining a positive peak value of the magnetizing current during a half-cycle in which the output voltage transitions from a positive maximum to a negative maximum; storing the positive peak value and the negative peak value; determining a second positive peak value of the magnetizing current during a second half-cycle in which the output voltage transitions from the positive maximum to the negative maximum; determining an onset of core saturation in a positive direction based on the positive peak value of the magnetizing current and the second positive peak value of the magnetizing current; determining a control action based on the onset of core saturation; and implementing the control action to control the magnetizing current in the transformer.

According to aspects of the invention, determining an onset of core saturation in a positive direction comprises comparing the difference between the positive peak value of the magnetizing current and the second positive peak value of the magnetizing current with a predetermined threshold value.

According to further aspects of the invention, a windowing technique is used whereby a negative peak value of the magnetizing current is determined during a half-cycle in which the output voltage transitions from the negative maximum to the positive maximum; the negative peak value is stored; a second negative peak value of the magnetizing current is determined during a second half-cycle in which the output voltage transitions from the negative maximum to the positive maximum; and an onset of core saturation in a negative direction is determined based on the negative peak value of the magnetizing current and the second negative peak value of the magnetizing current.

According to further aspects of the invention, determining the control action comprises detection of the onset of core saturation in the positive direction and the onset of core saturation in the negative direction.

Another embodiment of the present invention is directed to a method of controlling the output voltage of a transformer having a transformer core, comprising detecting a dc saturation in the transformer core; determining a transformer magnetizing current; receiving a signal proportional to the transformer magnetizing current; and adjusting the output voltage responsive to the signal.

According to aspects of the invention, the transformer magnetizing current comprises detecting a current using a dc sensor, and the signal is generated proportional to the transformer magnetizing current based on the detected current. Moreover, a dc component of the output voltage is adjusted to compensate for the dc saturation of the transformer.

According to further aspects of the invention, a continuous comparison technique is used to detect the dc saturation in the transformer core and comprises searching for positive and negative peak values of the magnetizing current, updating the positive and negative peak values once per power frequency cycle, storing the positive and negative peak values, and comparing the positive and negative peak values from the current cycle to the positive and negative peak values in the previous cycle.

A further aspect of the present invention is directed to a method of extracting a magnetizing current in a transformer having a plurality of windings, the transformer having a primary and a secondary and providing fluxes due to a transformer primary current and a transformer secondary current. The method comprises disposing the windings through a current sensor in such a way that the fluxes due to the transformer primary current and the secondary current cancel, thereby providing the magnetizing current as the output of the current sensor.

The foregoing and other aspects of the present invention will become apparent from the following detailed description of the invention when considered in conjunction with the accompanying drawings.

DESCRIPTION OF EXEMPLARY EMBODIMENTS AND BEST MODE

The present invention relates to the application of a switch-mode converter in a dc-ac inverter configuration producing a power-frequency sinusoidal voltage that is applied to an output transformer. Differential measurement of the transformer magnetizing current is used along with a delta-modulation algorithm to provide an efficient solution, with faster response times, low losses, a low cost sensor, and with immunity to dc drift in the measuring electronics.

Figure 1:
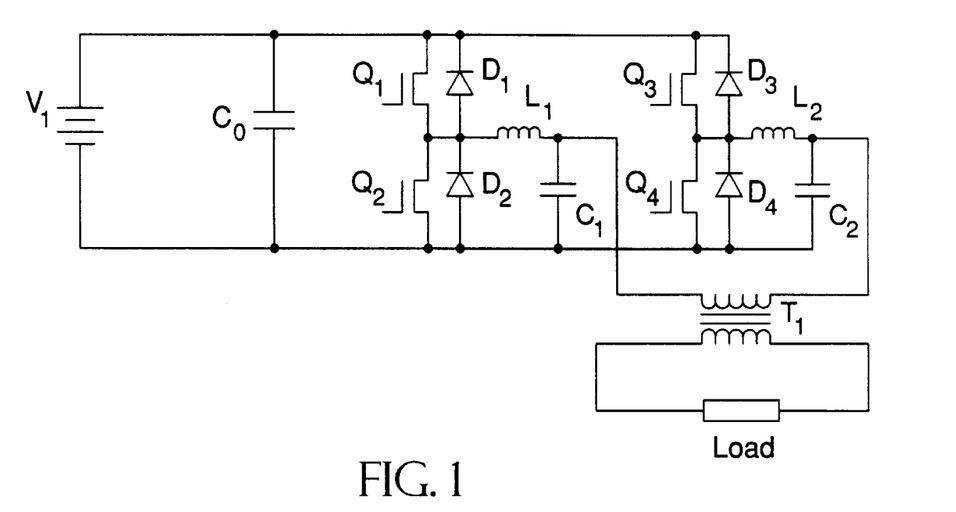
FIG. 1 is a schematic circuit diagram of an exemplary converter that is useful in explaining the present invention.

FIG. 1 is a schematic circuit diagram of an exemplary converter that is useful in explaining the present invention. The converter shown is a single-phase full-bridge inverter. Each of the two half-bridges shown in FIG. 1 produces a high-frequency PWM output voltage that, when filtered by the LC circuits shown, results in a sinusoidal power frequency voltage at the output terminals. The converter is controlled in such a way that the power frequency voltages produced at the two terminals are phase shifted 180 degrees, resulting in a total output voltage with amplitude twice that of each half-bridge. The outputs of the two half-bridges are then connected to the terminals of the output transformer, which changes the voltage to a desired output level. This converter configuration is well known in the art, and is generally referred to as a "full-bridge" or "H-bridge" converter. This converter is capable of four-quadrant operation, meaning that the operating point (defined by the output voltage and output current) can move smoothly between quadrants. It is therefore possible to produce any desired combination of positive and negative voltage and current with this type of converter.

Because the above-described configuration may produce an unwanted small direct voltage across the transformer primary in addition to the power-frequency sinusoid, special care must be taken to prevent dc saturation of the transformer core. This is normally accomplished by measurement of the primary current and extraction of the dc component by filtering.

The present invention measures and corrects for dc current in the transformer primary winding. To minimize losses, a Hall effect or other dc sensor is used. If the transformer primary alone were routed through the current measuring device, the device would need to be rated for the full primary current of the transformer. To resolve this issue, the present invention uses a direct differential measurement of the magnetizing current. A direct differential measurement requires that the sensor be rated only for the transformer magnetizing current, which is typically orders of magnitude smaller than the total primary current. This differential measurement is accomplished by winding the transformer secondaries through the current sensor in such a way that the magnetic fluxes produced by the primary and secondary currents cancel, leaving only the flux caused by the magnetizing current. A simplified depiction of the method is described with respect to FIG. 2.

Figure 2:
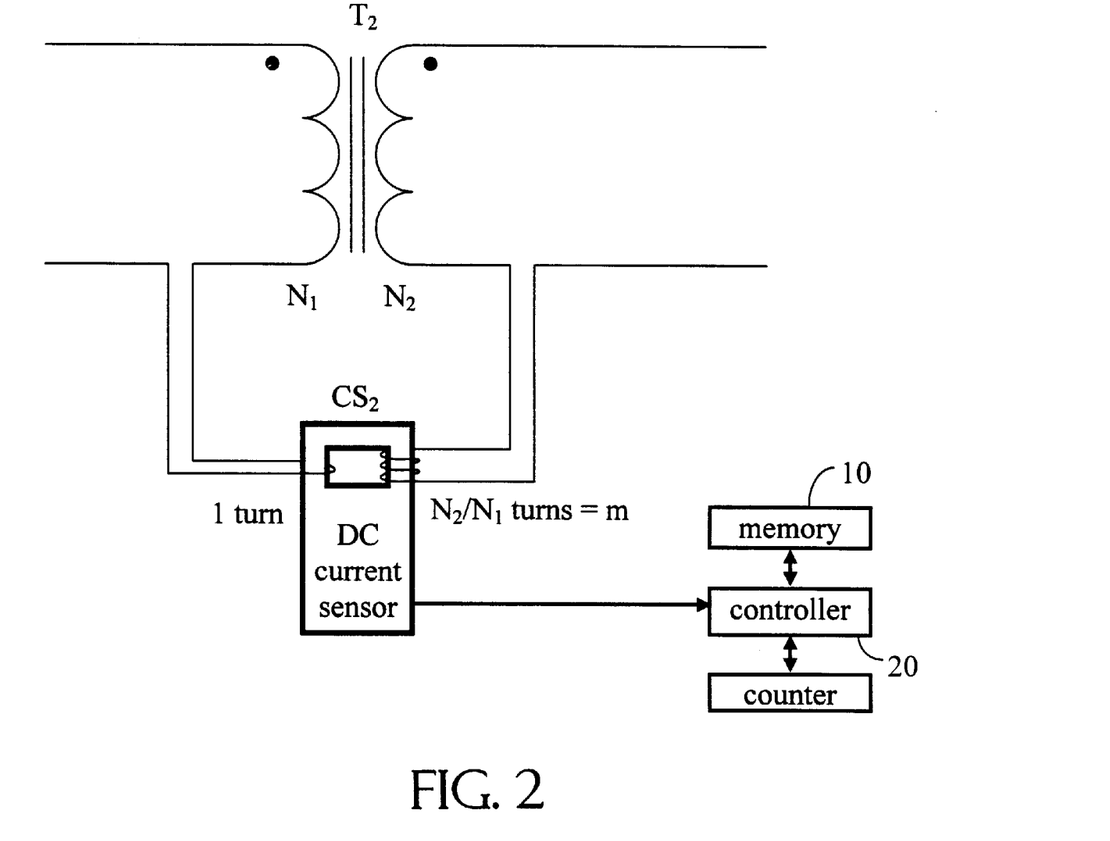
FIG. 2 is a schematic circuit diagram of an exemplary dc current sensor with transformer in accordance with the present invention.

FIG. 2 is a schematic diagram of an exemplary dc current sensor CS2 with a transformer T2 in accordance with the present invention. Also shown is a storage memory 10 and controller 20, that are used in the storage of values and the control of output voltages as described herein. It should be understood that transformer T2 in accordance with the present invention in FIG. 2 represents one possible embodiment of transformer T1 in FIG. 1. In the present embodiment, the transformer T2 is designed to boost the inverter output voltage to a higher level, and therefore N2>N1, where N1 and N2 are the number of turns in respective windings of the transformer. It is contemplated that other embodiments are possible in which N2<N1, and for these embodiments it is straightforward to modify (reverse) the winding arrangements on the differential measuring device or current sensor CS2 accordingly.

It is desirable that the primary to secondary turns ratio have a large common factor (the ideal case is when the ratio of N1:N2 or N2:N1 is a relatively small integer). This preference places a design constraint on the inverter output voltage, and, consequently, the inverter dc bus voltage. To use the differential measurement method, these issues are preferably taken into account when the inverter dc bus voltage is being established.

Preferably, the windings are disposed through a current sensor in a reduced primary to secondary turns fraction ratio based on the number of turns in the windings. Desirably, the reduced primary to secondary turns fraction ratio is the most reduced fraction ratio. For example, if N1=30 (primary turns) and N2=120 (secondary turns), then the common factor is 30. The most reduced fraction in this case is 120/30=4:1. Another possible reduced fraction in this case is 8:2, but this is not the most reduced fraction. A ratio of 8 secondary turns and 2 primary turns could be used through the current sensor, but the lowest cost configuration uses the most reduced fraction, which, in this case, is one primary turn and N2/N1=4 secondary turns.

When N2>N1, it is therefore desired that N2/N1=m, where m is an integer. For the case depicted in FIG. 2, differential measurement is accomplished by routing one primary turn and m secondary turns through the dc measuring device or current sensor CS2.

According to an embodiment of the present invention, the number of parallel primary strands disposed in the transformer is an even number and one half of the number of parallel primary strands routed through the sensor is taken from a first section of the transformer and the other half of the number of parallel primary strands routed through the sensor is taken from a second section of the transformer, different from the first section. Thus, the parallel primary strands are disposed on at least two different sections of the transformer core.

The primary current will be larger than the secondary current by the ratio m, and therefore multiple parallel windings may be used for the primary. It would be natural in this case to use (m×n) parallel windings on the primary and n parallel windings on the secondary, with identical conductor for both primary and secondary. In this way, the current carried by each individual conductor or strand is identical on both primary and secondary, but the total cross sectional area of the primary conductors is larger by the ratio m. This can present a physical problem in routing the large primary through the measuring device CS.

Figure 3:
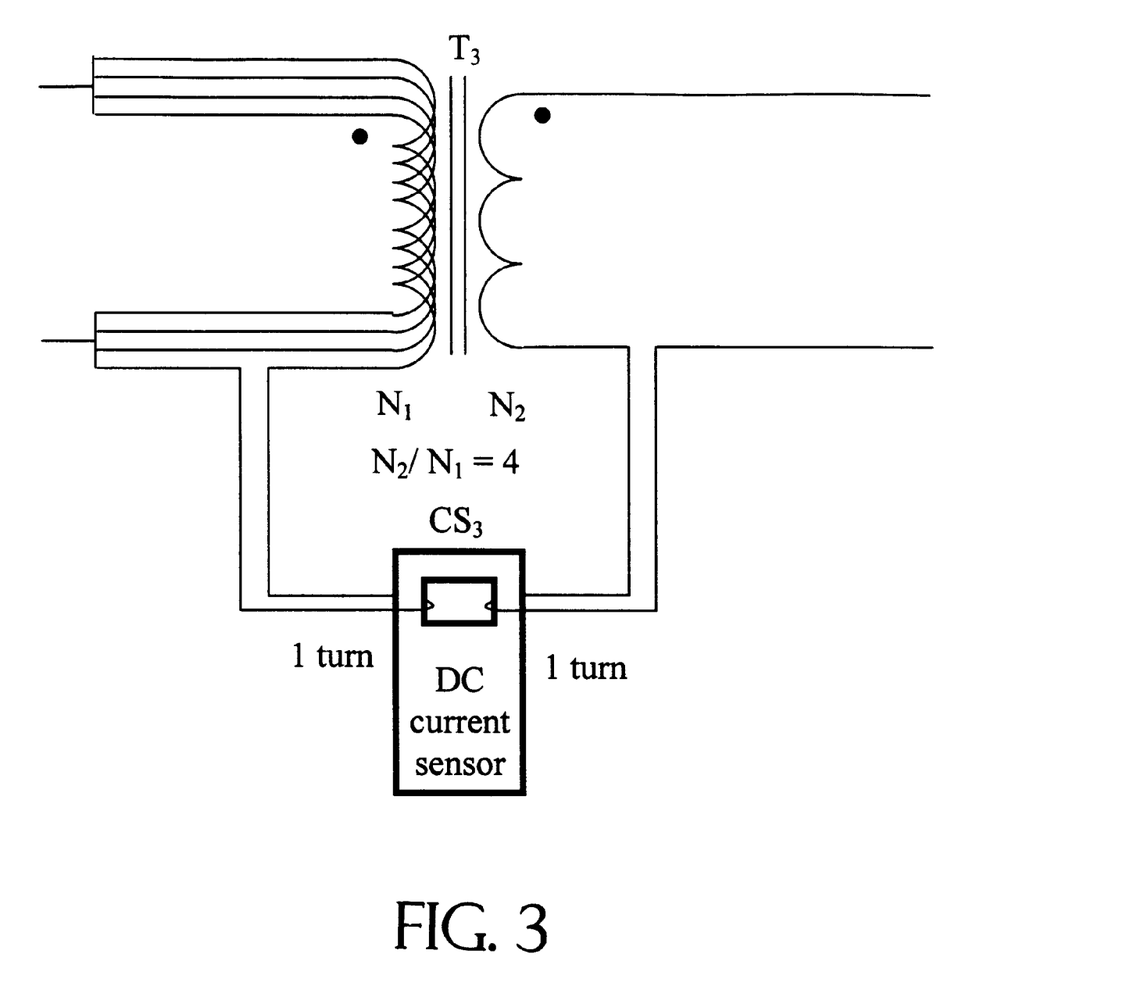
FIG. 3 is a schematic circuit diagram of an exemplary dc current sensor with a transformer having parallel primary windings in accordance with the present invention.

For a simplified case with n=1 and m=4, FIG. 3 shows how the differential measurement could be configured for this case. FIG. 3 is a schematic circuit diagram of an exemplary dc current sensor CS3 with a transformer T3 having parallel primary windings in accordance with the present invention. A controller and storage memory are not shown, though it is understood that they are present, as in FIG. 2. It should be understood that transformer T3 in accordance with the present invention in FIG. 3 can be used as a further possible embodiment of transformer T1 in FIG. 1.

Figure 4:
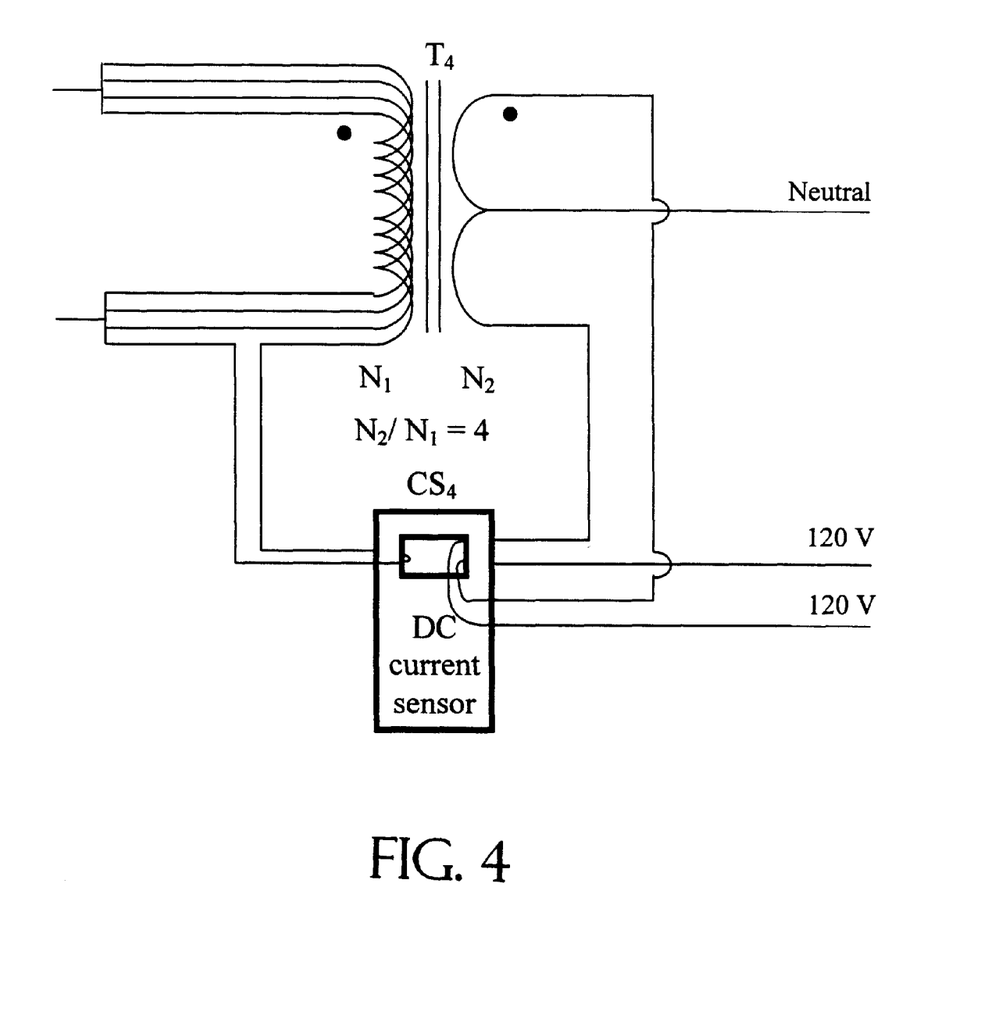
FIG. 4 is a schematic circuit diagram of an exemplary dc current sensor with a split-phase transformer having parallel primary windings in accordance with the present invention.

A single-phase inverter for residential or light commercial power supply would likely have a split-phase (120/240 V) transformer output. It is also possible to perform a differential measurement for this type of transformer, as shown in FIG. 4. FIG. 4 is a schematic circuit diagram of an exemplary dc current sensor CS4 with a split-phase transformer T4 having parallel primary windings in accordance with the present invention. It should be understood that transformer T4 in accordance with the present invention in FIG. 4 represents a further possible embodiment of transformer T1 in FIG. 1. The arrangement shown in FIG. 4 allows for load unbalance between the two 120 V legs, while still preserving cancellation of flux due to load current. A controller and storage memory are not shown, though it is understood that they are present, as in FIG. 2.

It is recognized that the arrangements shown in FIGS. 2–4 are not all-inclusive, and other transformer winding configurations are contemplated. Provided that the integer relationships described above regarding turns ratio and parallel windings are respected, it is nonetheless possible to configure a differential measurement of the transformer magnetizing current using one or more of the above described techniques. For example, if N1:N2 is 2:3, one could route the secondary through the current sensor three times and the primary through twice. The same technique can be used for multiple secondaries, each being routed through the sensor accordingly.

The above-described measuring technique produces a signal from the measuring device proportional to the transformer magnetizing current. It is desirable to use the information in this signal to produce small modifications in the dc component of the inverter output voltage in such a way that any tendency toward dc saturation of the transformer is immediately counteracted by an appropriate adjustment in the dc output of the inverter.

One possible technique would be to filter the magnetizing current to extract the dc component, but this would introduce time delays associated with the filter time constant, which could adversely impact the stability of the algorithm. Extraction of the dc component of the signal has the additional drawback of introducing sensitivity to dc drift in the measuring electronics. DC drift due to temperature or other effects would also adversely affect the stability of the compensating algorithm, since the algorithm would be unable to distinguish between the dc component of the magnetizing current and dc drift due to temperature or other effects. The dc drift problem could be partially addressed by use of closed-loop dc sensors, but this would introduce additional cost and would not eliminate all possible sources of dc drift. To address these issues while retaining low-cost open-loop dc sensors, a compensating algorithm based on delta modulation techniques has been developed. The algorithm takes into consideration the entire magnetizing current waveform, as depicted in FIG. 5.

Figure 5:
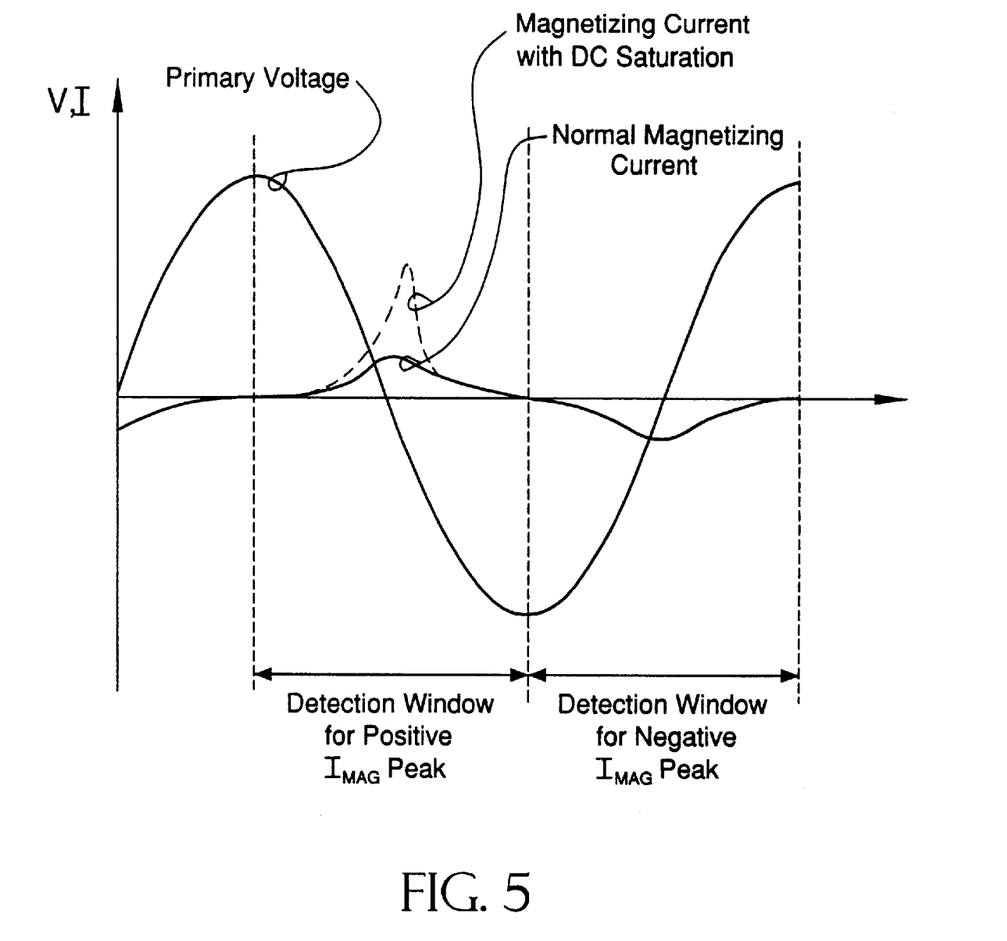
FIG. 5 shows an exemplary output transformer primary voltage and magnetizing current waveshape.

FIG. 5 shows an exemplary output transformer primary voltage and magnetizing current waveshape. During normal conditions with no dc unbalance, the transformer magnetizing current is symmetrical around a nominal (average) value. The nominal value is zero in the actual magnetizing current for balanced conditions, but will be nonzero in the measured signal when dc drift occurs in the measuring electronics. When dc saturation begins to occur, the magnetizing current becomes asymmetrical around the nominal value, with large spikes of current in one direction.

In accordance with the present invention, a windowing technique is used to search for the positive and negative peaks of the magnetizing current. These values are updated once per power frequency cycle, and the values from the previous cycle are retained for comparison to the present cycle.

Figure 6:
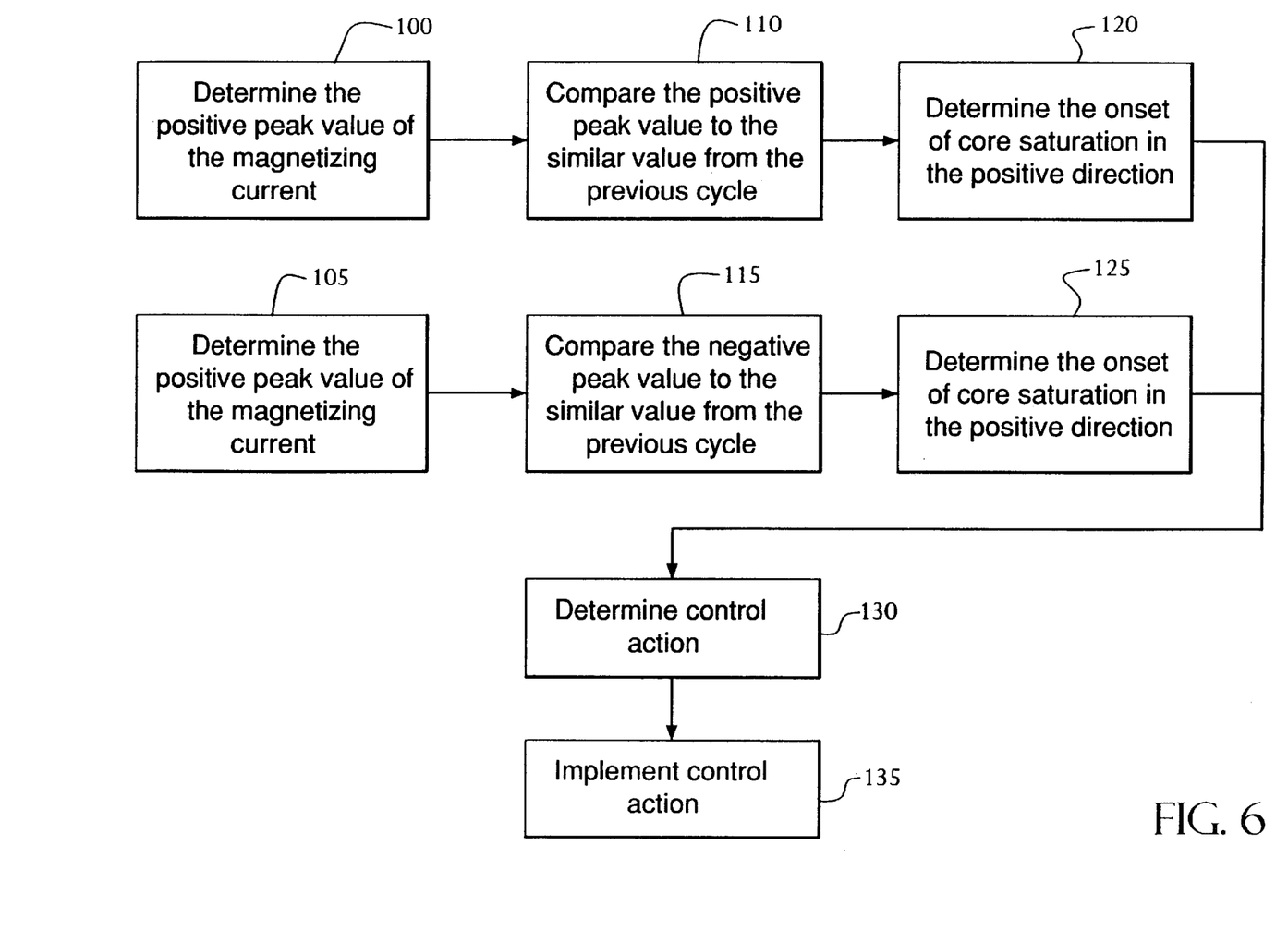
FIG. 6 is a flow chart of an exemplary method of controlling magnetizing current in accordance with the present invention.

FIG. 6 is a flow chart of an exemplary method of controlling magnetizing current in accordance with the present invention. At step 100, during the half-cycle in which the output voltage transitions from its positive maximum to its negative maximum, the positive peak value of the magnetizing current is determined, and during the half-cycle in which the output voltage transitions from its negative maximum to its positive maximum, at step 105, the negative peak value of the magnetizing current is determined. At step 110, the positive peak magnetizing current value is compared to the similar value from the previous cycle, and the onset of core saturation in the positive direction is then determined at step 120. In particular, a logical signal pos_sat is set to "true" if the difference from step 110 is greater than a predetermined threshold value "A" or if the positive current peak plus the negative current peak is greater than a predetermined threshold level "B". This detects the onset of core saturation in the positive direction.

Similarly, at step 115, the negative peak magnetizing current value is compared to the similar value from the previous cycle, and the onset of core saturation in the negative direction is then determined at step 125. In particular, the logical signal neg_sat is set to "true" if the difference from step 115 is less (more negative) than a predetermined threshold value "−A" or if the positive current peak plus the negative current peak is less (more negative) than a predetermined threshold level "−B". This detects the onset of core saturation in the negative direction.

Based on the results of the core saturation determinations in steps 120 and 125, a control action is determined at step 130, preferably in accordance with a truth table such as:

| pos sat | neg sat | Action |
|---|---|---|
| 0 | 0 | None |
| 0 | 1 | Increase dc output level by one bit |
| 1 | 0 | Decrease dc output level by one bit |
| 1 | 1 | None |

The "one bit" change in dc output level corresponds to the smallest discrete increment by which the inverter output can be changed. This value is implementation-dependent, and is governed by the PWM frequency and the number of timer clock cycles used to time one complete PWM cycle. In the experimental system, one bit change in the PWM output corresponded to a voltage change of about 1% of the peak transformer primary voltage. According to other aspects, the predetermined discrete increment "one bit" change can correspond to the minimum discrete voltage change allowable by the controller or available in the implementation. At step 135, the determined control action is implemented.

The threshold values "A" and "B" above are determined preferably by computer simulation of the transformer core and primary winding. Threshold value "A" is used to detect the onset of dc saturation, and is therefore small (on the order of about 5 to 10% of the peak magnetizing current value). Threshold value "B" is influential only during large disturbances, and is set to a large value of about 150 to 300% of the peak magnetizing current.

By comparing present-cycle peaks to previous-cycle peaks instead of comparing them to an absolute level, the above described technique is immune to the effects of slow dc drift due to temperature or component variations. Provided that dc drift due to these effects occurs slowly, which is normally the case, the nominal value of the magnetizing current can move significantly away from zero without impacting the algorithm. It is possible that an extremely large dc drift could impact the algorithm via the comparison used in the threshold "B" logic above; however, it is straightforward to select threshold B large enough to include the full anticipated range of dc drift.

Figure 7:
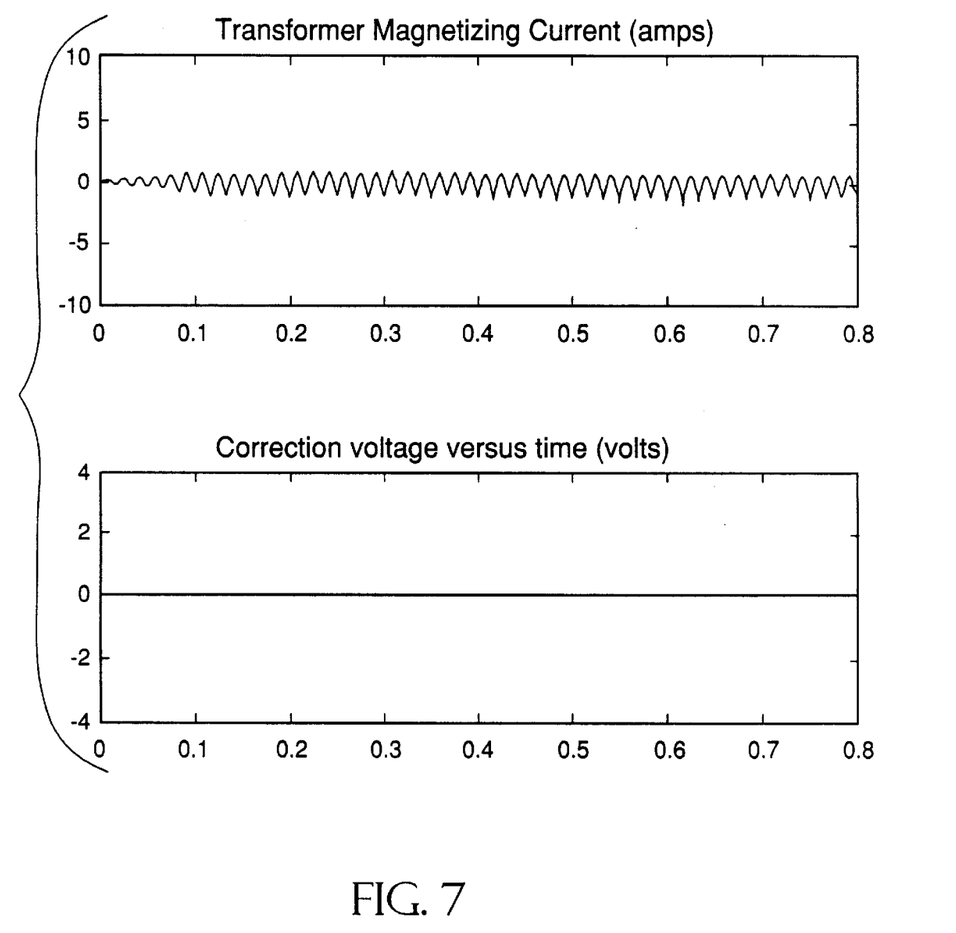
FIG. 7 shows a simulation of a transformer core under normal conditions with no dc saturation.
Figure 8:
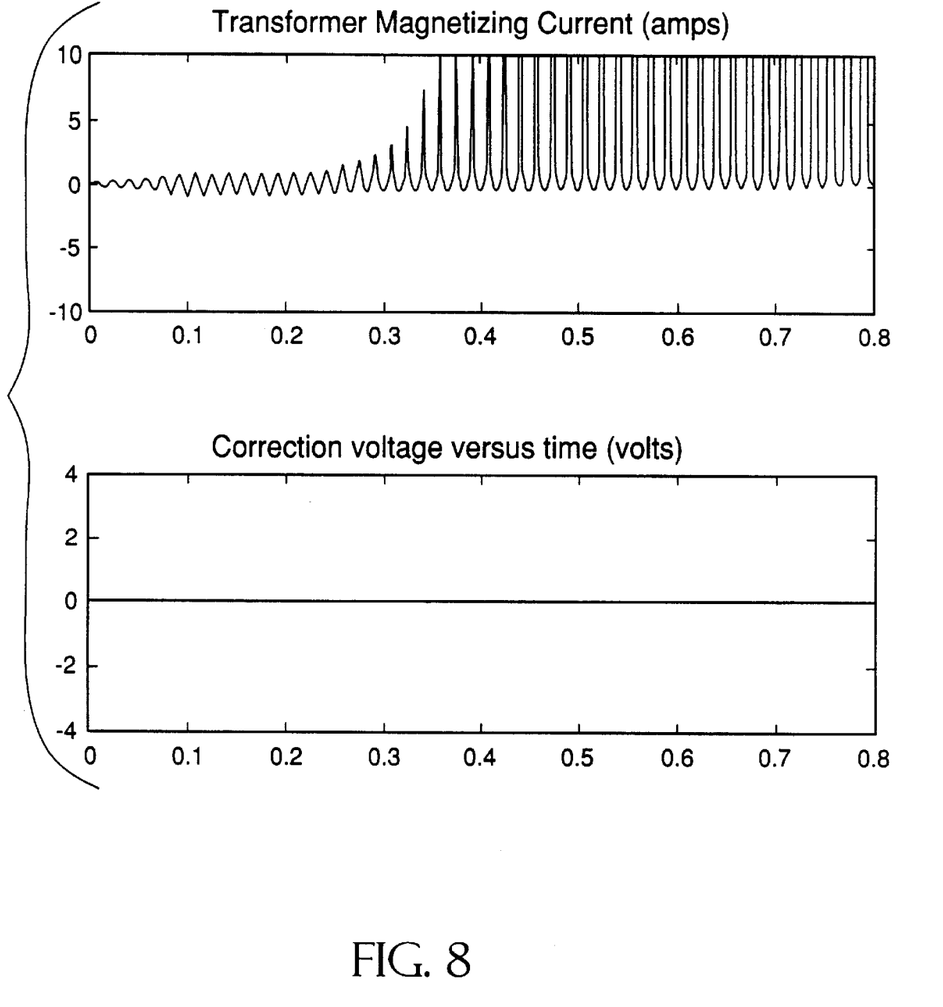
FIG. 8 shows a simulation of a transformer core with an applied dc voltage that causes dc offset saturation conditions.
Figure 9:
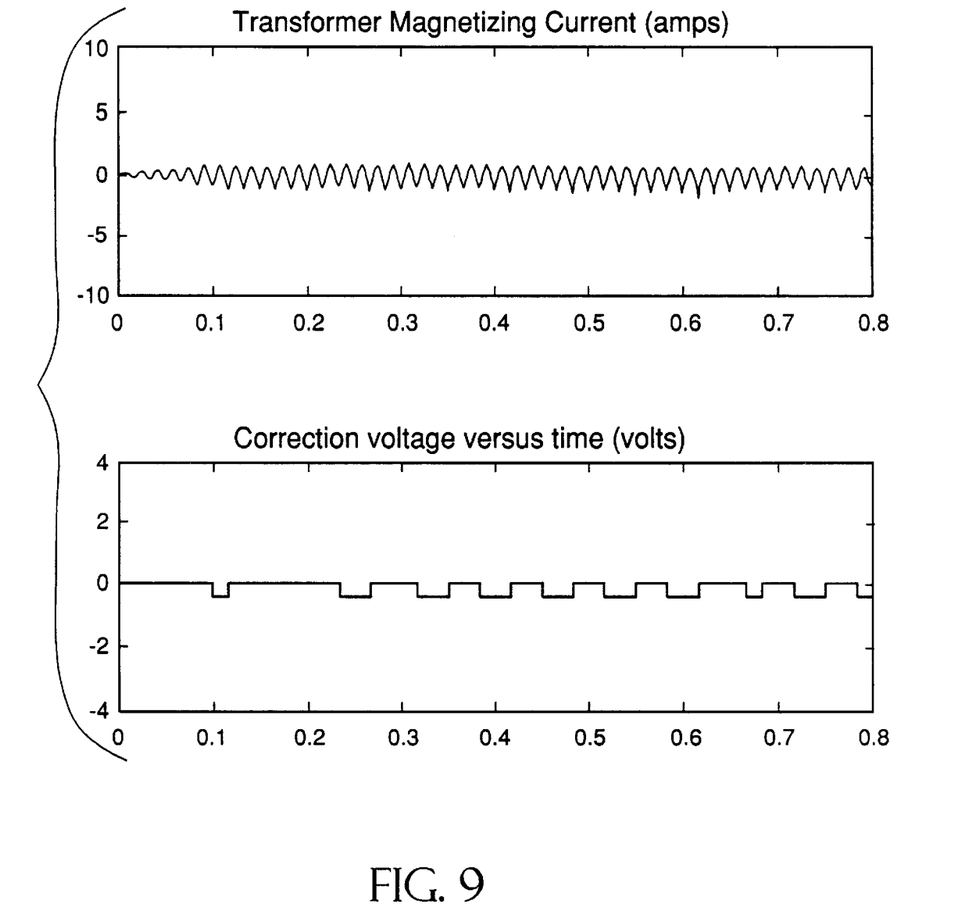
FIG. 9 shows a simulation of a transformer core under the same dc offset saturation conditions, but with delta-modulated control of the magnetizing current in accordance with the present invention.

Operation of the above described delta-modulation technique is described with respect to FIGS. 7–9. These figures depict simulations of a toroidal core transformer, with simulated core parameters matched to an actual transformer unit. Note that in all of these simulations, a "soft start" technique is used to energize the transformer, meaning that the primary voltage is ramped from zero to rated value over the first few cycles of the simulations.

FIG. 7 shows a simulation of the transformer under normal conditions with no direct voltage across the primary. The magnetizing current stabilizes at its nominal value, and no corrective action by the control is desired.

FIG. 8 shows a simulation of the same transformer under conditions with severe dc offset saturation. In this simulation, a small direct "disturbance" voltage of about 0.2 volts is added to the sinusoidal primary voltage at t=0.2 seconds. This small direct voltage causes the transformer core to saturate quite quickly, with large spikes of magnetizing current. It would not be possible to sustain continued operation of the transformer under these conditions.

FIG. 9 shows conditions identical to FIG. 8, but with the delta modulation technique of the present invention enabled to prevent dc saturation of the core. The technique correctly responds to the onset of core saturation by adding a fixed compensating voltage to the sinusoidal voltage produced by the PWM inverter. In the simulation shown in FIG. 9, the minimum output voltage step size is conservatively chosen to be significantly larger than the disturbance voltage to illustrate an exemplary operation of the present invention. To prevent saturation of the core, the volt-seconds applied by the control preferably compensate for the volt-seconds applied by the disturbance. The delta modulation technique of the present invention is successful in accomplishing this.

The above described technique has been tested experimentally on two different types of transformers and has successfully controlled the transformer magnetizing current and prevented dc saturation. The technique can in principle be used on any transformer with a turns ratio that is rational, but is most easily implemented for transformers that have a large common factor, i.e., small m where N2/N1=m.

Although illustrated and described herein with reference to certain specific embodiments, the present invention is nevertheless not intended to be limited to the details shown. Rather, various modifications may be made in the details within the scope and range of equivalents of the claims without departing from the invention.

What is claimed:

1. A method of controlling a magnetizing current in a transformer comprising a primary and a secondary, an output voltage and a peak primary voltage, comprising:

determining a positive peak value of the magnetizing current using an external current sensor during a half-cycle in which the output voltage transitions from a positive maximum to a negative maximum;

storing the positive peak value;

determining a second positive peak value of the magnetizing current using an external current sensor during a second half-cycle in which the output voltage transitions from the positive maximum to the negative maximum;

determining an onset of core saturation in a positive direction based on the positive peak value of the magnetizing current and the second positive peak value of the magnetizing current, by comparing the difference between the positive peak value of the magnetizing current and the second positive peak value of the magnetizing current with a predetermined threshold value;

determining a control action based on the onset of core saturation; and implementing the control action to control the magnetizing current in the transformer.

2. The method of claim 1, wherein determining the control action comprises determining the control action in accordance with a predetermined truth table.

3. The method of claim 1, further comprising:

determining a negative peak value of the magnetizing current during a half-cycle in which the output voltage transitions from the negative maximum to the positive maximum;

storing the negative peak value;
determining a second negative peak value of the magnetizing current during a second half-cycle in which the output voltage transitions from the negative maximum to the positive maximum; and
determining an onset of core saturation in a negative direction based on the negative peak value of the magnetizing current and the second negative peak value of the magnetizing current.

4. The method of claim 3, wherein determining an onset of core saturation in a negative direction comprises comparing the difference between the negative peak value of the magnetizing current and the second negative peak value of the magnetizing current with a predetermined threshold value.

5. The method of claim 3, wherein determining the control action comprises determining the control action based on the onset of core saturation in the positive direction and the onset of core saturation in the negative direction.

6. The method of claim 1, wherein the control action is one of nothing, increase the voltage output by a predetermined discrete increment, and decrease the voltage output by the predetermined discrete increment.

7. The method of claim 6, wherein the predetermined discrete increment is a minimum discrete voltage change allowable by the control action.

8. The method of claim 7, wherein the predetermined discrete increment is based on a pulse width modulation (PWM) frequency and a number of clock cycles used to complete one PWM cycle.

9. A method of extracting a magnetizing current in a transformer having a plurality of windings, the transformer comprising a primary and a secondary and providing fluxes due to a transformer primary current and a transformer secondary current, comprising:
disposing the windings through a current sensor in such a way that the fluxes due to the transformer primary current and the secondary current cancel; and
providing a signal proportional to the magnetizing current as the output of the current sensor.

10. The method of claim 9, wherein disposing the windings comprises routing one primary turn and a plurality of secondary turns through the current sensor.

11. The method of claim 9, wherein disposing the windings comprises routing one secondary turn and a plurality of primary turns through the current sensor.

12. A method of controlling the output voltage fed to a transformer having a transformer core and a plurality of windings, the transformer comprising a primary and a secondary and providing fluxes due to a transformer primary current and a transformer secondary current, comprising:
disposing a plurality of parallel windings on the primary and a second plurality of parallel windings on the secondary and through a current sensor in such a way that the fluxes due to the transformer primary current and the secondary current cancel;
determining a transformer magnetizing current;
providing a signal proportional to the magnetizing current as the output of the current sensor;
detecting the onset of dc saturation in the transformer core from the magnetizing current; and
adjusting the output voltage fed to the transformer responsive to the detected dc saturation.

13. A system for adjusting the output voltage in a transformer, comprising:
an external current sensor connected to the transformer that detects magnetizing current in the transformer;
a controller connected to the transformer that determines a voltage adjustment for output voltage of the transformer and provides the voltage adjustment to the output voltage of the transformer; and
a storage memory,
wherein the current sensor determines a positive peak value of the magnetizing current during a half-cycle in which the output voltage transitions from a positive maximum to a negative maximum, and determines a second positive peak value of the magnetizing current during a second half-cycle in which the output voltage transitions from the positive maximum to the negative maximum;
wherein the storage memory stores the positive peak value and the negative peak value; and
wherein the controller determines an onset of core saturation in a positive direction based on the positive peak value of the magnetizing current and the second positive peak value of the magnetizing current, and wherein the controller compares the difference between the positive peak value of the magnetizing current and the second positive peak value of the magnetizing current with a predetermined threshold value to determine the onset of core saturation.

14. The system of claim 13, wherein the voltage adjustment is one of nothing, increase the voltage output by a predetermined discrete increment, and decrease the voltage output by the predetermined discrete increment.

15. The system of claim 14, wherein the predetermined discrete increment is based on a pulse width modulation (PWM) implementation using a digital counter with a predetermined number of clock cycles used to complete one PWM cycle.

16. The system of claim 14, wherein the predetermined discrete increment is a minimum discrete voltage change allowable by the controller.

17. The system of claim 13, wherein the controller determines a negative peak value of the magnetizing current during a half-cycle in which the output voltage transitions from the negative maximum to the positive maximum; stores the negative peak value in the storage memory; determines a second negative peak value of the magnetizing current during a second half-cycle in which the output voltage transitions from the negative maximum to the positive maximum; and determines an onset of core saturation in a negative direction based on the negative peak value of the magnetizing current and the second negative peak value of the magnetizing current.

18. The system of claim 17, wherein the controller determines voltage adjustment based on the onset of core saturation in the positive direction and the onset of core saturation in the negative direction.

19. The system of claim 13, wherein the storage memory stores a truth table, and the controller determines the voltage adjustment in accordance with the truth table.

20. A method of controlling a magnetizing current in a transformer comprising a primary and a secondary, an output voltage and a peak primary voltage, the transformer providing fluxes due to a transformer primary current and a transformer secondary current comprising:
disposing a plurality of parallel windings on the primary and a second plurality of parallel windings on the secondary and through a current sensor in such a way that the fluxes due to the transformer primary current and the secondary current cancel;
providing a signal proportional to the magnetizing current as the output of the current sensor;

determining a positive peak value of the magnetizing current during a half-cycle in which the output voltage transitions from a positive maximum to a negative maximum;

storing the positive peak value;

determining a second positive peak value of the magnetizing current during a second half-cycle in which the output voltage transitions from the positive maximum to the negative maximum;

determining an onset of core saturation in a positive direction based on the positive peak value of the magnetizing current and the second positive peak value of the magnetizing current;

determining a negative peak value of the magnetizing current during a half-cycle in which the output voltage transitions from the negative maximum to the positive maximum;

storing the negative peak value;

determining a second negative peak value of the magnetizing current during a second half-cycle in which the output voltage transitions from the negative maximum to the positive maximum;

determining an onset of core saturation in a negative direction based on the negative peak value of the magnetizing current and the second negative peak value of the magnetizing current;

determining a control action based on the onset of core saturation; and implementing the control action to control the magnetizing current in the transformer.

* * * * *